Jan. 29, 1946.     B. STECHBART     2,393,832
OPTICAL RETICLE
Filed Aug. 30, 1944     3 Sheets-Sheet 1
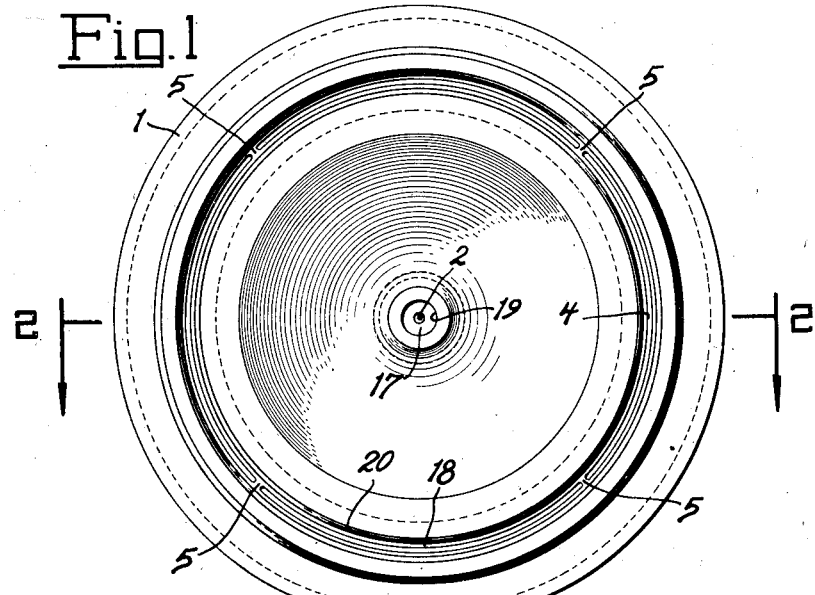
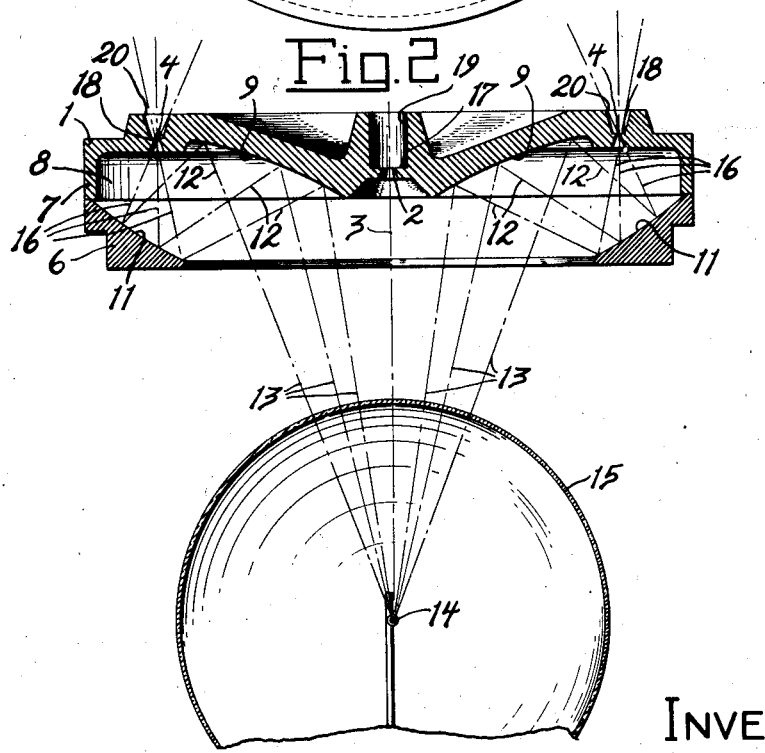
INVENTOR
BRUNO STECHBART
BY Robert F. Miehle, Jr.
ATTY.

Jan. 29, 1946. B. STECHBART 2,393,832
OPTICAL RETICLE
Filed Aug. 30, 1944 3 Sheets-Sheet 2
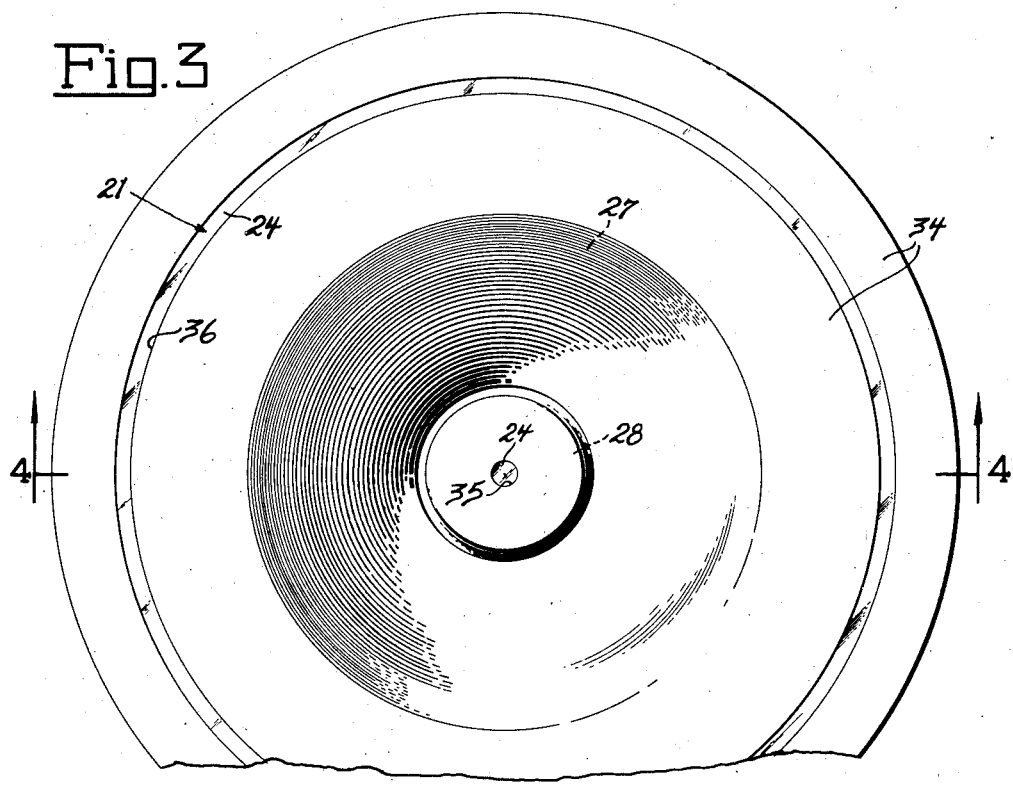
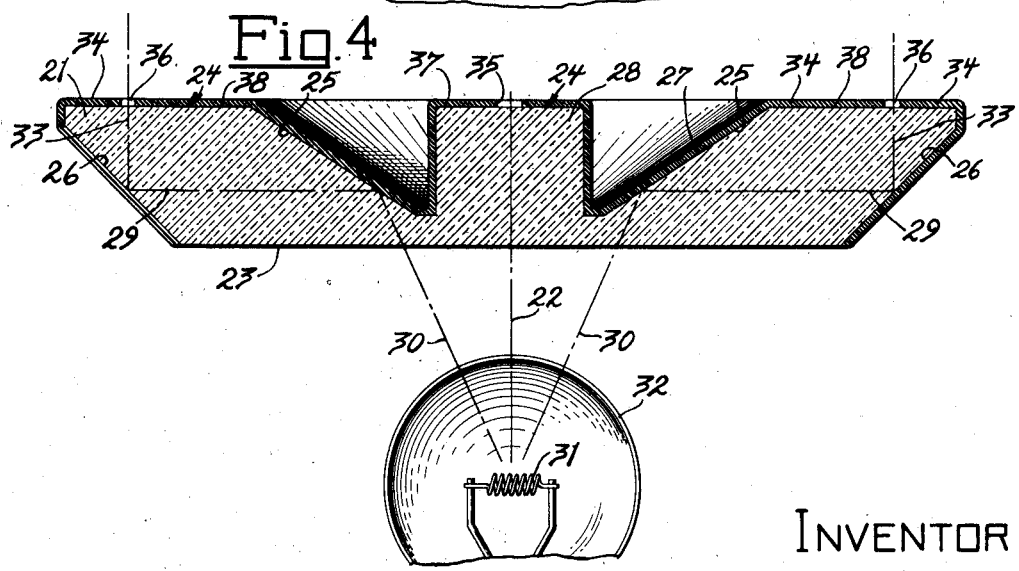
INVENTOR
BRUNO STECHBART
BY Robert F. Miehle, Jr.
ATT'Y.

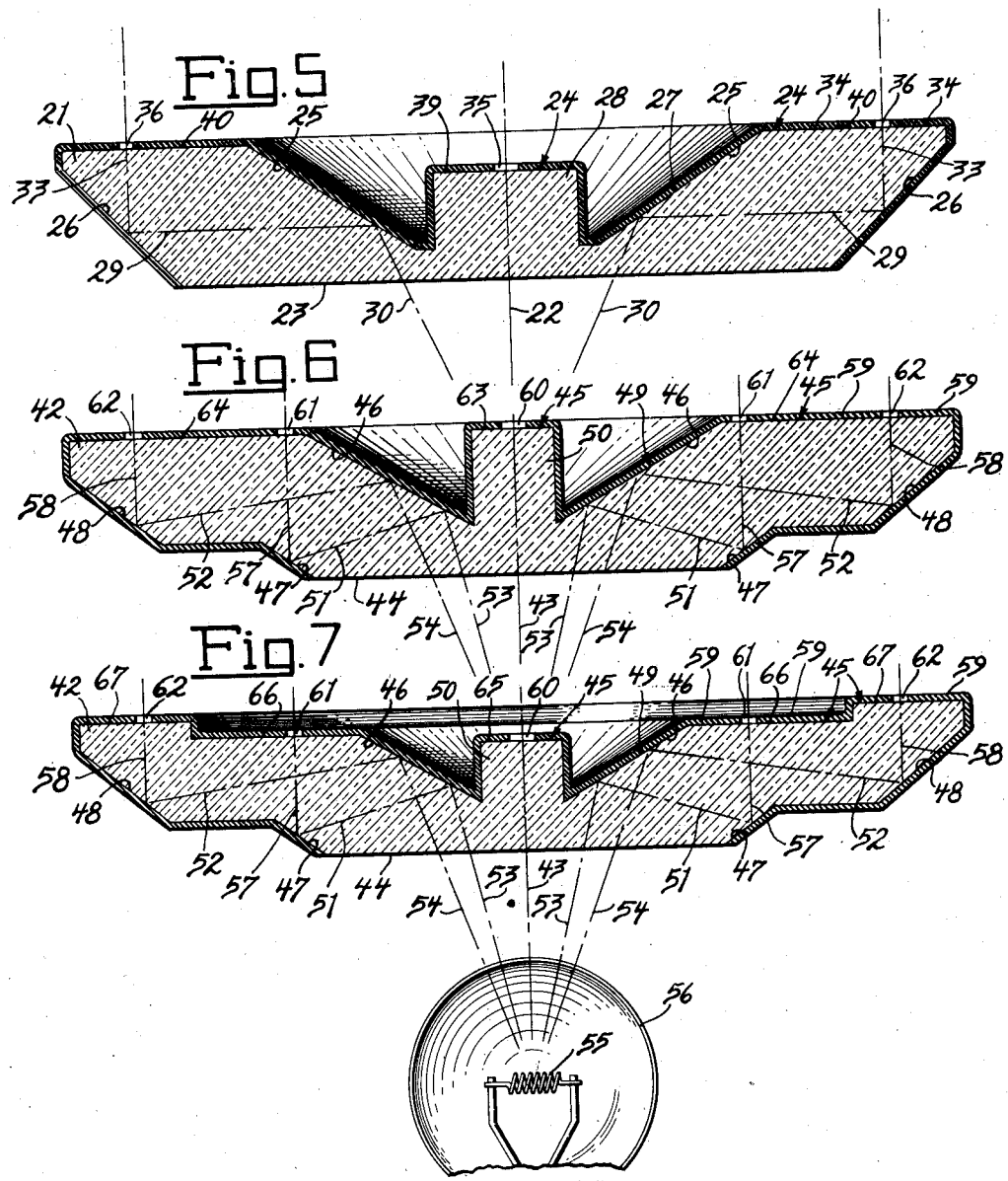

Patented Jan. 29, 1946

2,393,832

UNITED STATES PATENT OFFICE 2,393,832

OPTICAL RETICLE

Bruno Stechbart, Park Ridge, Ill., assignor to The Bell & Howell Company, Chicago, Ill., a corporation of Illinois

Application August 30, 1944, Serial No. 551,806

10 Claims. (Cl. 88—1)

My invention relates particularly to optical reticles of the illuminated type from which images of the illuminated reticle designs thereof are projected by projection objectives to provide sighting images.

Objects of the invention reside in the provision of a novel and effective optical reticle of the above type, which provides adequate brilliancy throughout the projected image of the reticle design thereof, particularly at the circumferential region thereof, and which provides adequate sharpness throughout the projected image also particularly at the circumferential region thereof.

The invention will be better understood by reference to the accompanying drawings forming a part hereof and in which—

Figure 1 is a face elevational view of an optical reticle embodying one form of my invention;

Figure 2 is a sectional view on the line 2—2 of Figure 1 and showing the reticle in cooperative relation with a light source;

Figure 3 is a partial face elevational view of an optical reticle embodying another form of my invention;

Figure 4 is a sectional view on the line 4—4 of Figure 3 and showing the reticle in cooperative relation with a light source; and Figures 5, 6 and 7 are axial sectional views of optical reticles respectively embodying other forms of my invention and of which the reticle of Figure 7 is shown in cooperative relation with a light source.

Referring to Figures 1 and 2, a circular reticle design forming mask of opaque material, such as metal, is designated at 1 and is provided with a light opening 2 therethrough at the reticle axis 3 and with an annular additional light opening 4 therethrough disposed concentrically of the reticle axis and consequently spaced radially therefrom, the opening 4 being interrupted by bridging portions 5 connecting the portions of the mask inside and outside of the opening 4 to provide a unitary mask structure.

An annular member 6 is axially engaged at its periphery against a peripheral cylindrical flange 7 of the mask 1 in concentric relation with the mask and thus forms with the mask an annular partial enclosure 8 open internally thereof, this partial enclosure embracing the annular light opening 4. The mask 1 and annular member 6 are secured in the aforesaid relation by usual means not shown and as so secured form the reticle body.

Two generally frusto-conical reflectors 9 and 11 of different diameters are disposed concentrically of and at correspondingly extending acute angles to the reticle axis 3, and the diametrically smaller reflector 9 is provided on the face of the mask 1 opposedly related with the annular member 6 and the diametrically larger reflector is provided on the face of the annular member opposedly related with the mask, these reflectors being formed by surfaces of the mask and annular member as by plating these surfaces with a highly reflective metal.

The smaller or reticle axis adjacent reflector 9 is directed away from the mask 1 and toward the larger or reticle axis remote reflector 11 to reflect light, as designated at 12, to the larger reflector from, as designated at 13, a light source 14, shown as the filament of an incandescent lamp 15, on and spaced along the reticle axis 3 from the mask and reflectors, and the larger reflector is directed toward the smaller reflector and the mask and reflects light, as designated at 16, so reflected thereto through the annular or reticle axis remote light opening 4 of the mask, thus illuminating this light opening. Light also passes along the reticle axis 3 through the light opening 2 at this axis to illuminate this opening.

By reason of the reflection of the light through the annular light opening 4 by the reflectors 9 and 11, the light passes through this opening in relatively non-dispersive relation with the reticle axis, as compared with light passing through this opening directly from the light source 14, so that the light so reflected through this opening is directed substantially within the covering angle of a projection objective, not shown, disposed in focused relation with the reticle design forming mask for the projection of the reticle design image, with the result that sufficient light is received by the objective from the light opening 4 to provide adequate brilliancy of the projected image thereof, it being obvious that sufficient light is received by the objective from the light opening 2 at the reticle axis to provide adequate brilliancy of its projected image. Thus, the projected image of the entire reticle design is of adequate brilliancy.

For the purpose of further increasing the brilliancy of the projected image of the annular or reticle axis remote light opening 4, the reflectors 9 and 11 are concave in axial planes of the reticle axis and concentrate the light at this light opening.

The portions of the mask 1 respectively at the light openings 2 and 4 and respectively designated at 17 and 18 are spaced from each other longitudinally of the reticle axis and the portion of the mask at the center light opening 2 is closest to the light source 14, so that the reticle design of the mask is concave in the direction toward the projection objective with which the reticle is used and thus conforms with the field curvature of the objective with resulting uniformity of sharpness of the projected reticle design image.

While for structural reasons the mask 1 is comparatively thick at the portion thereof within which lie the light openings 2 and 4 and these light openings are continued to a radial plane of the reticle axis by enlarged light opening portions respectively designated at 19 and 20, it is obvious that these enlarged light opening portions by reason of their large size do not form the reticle design as do the comparatively restricted openings 2 and 4.

Referring to Figures 3, 4 and 5, a light transmitting prism of circular disk form and of suitable material, such as optical glass, is designated at 21 and is disposed across the reticle axis 22 in concentric relation therewith and the opposite faces 23 and 24 of the prism provide light entry and exit faces. The prism is also provided with two additional faces 25 and 26 providing internally reflecting faces of frusto-conical form and of different diameters disposed concentrically of and at correspondingly extending acute angles to the reticle axis, and the diametrically smaller reflecting face 25 is provided by an annular depression 27 at the exit face 24 and disposed concentrically of the reticle axis and providing a hub 28 forming the central portion of the exit face, and the diametrically larger reflecting face 26 is formed about the entry face 23. The reflecting faces 25 and 26 are preferably silver-coated in the usual manner to increase the reflection therefrom.

The smaller or reticle axis adjacent reflecting face 25 is directed internally of the prism 21 toward the entry face 23 and the larger or reticle axis remote reflecting face 26 to reflect light, as designated at 29, to the larger reflecting face from, as designated at 30, a light source 31, shown as the filament of an incandescent lamp 32 in Figure 4, on and spaced along the reticle axis 22 from the prism 21 and the reticle design forming mask hereinafter referred to, and the larger reflecting face is directed internally of the prism toward the exit face 24 and the smaller reflecting face and reflects light, as designated at 33, so reflected thereto toward the exit face.

An opaque reticle design forming mask 34 is provided at the exit face 24 and preferably, as shown, covers the surfaces of the depression 27 and the peripheral portion of the prism including the larger reflecting face 26, thus protectively covering the silver coating of the reflecting faces 25 and 26, the mask preferably being a relatively thick paint coating.

The mask 34 is provided with a first light opening 35 therethrough at the reticle axis and the hub 28 through which light passes along the reticle axis from the light source to illuminate the same, and is provided with an annular second light opening 36 therethrough disposed concentrically of the reticle axis and consequently spaced radially therefrom and disposed in surrounding relation with the depression 27, and through which light opening 36 light is reflected by the larger reflecting face 26 in relatively non-dispersive relation with the reticle axis to illuminate this light opening so that the projected image of this light opening is of adequate brilliancy as hereinbefore explained.

In Figure 4 the portions 37 and 38 of the exit face 24 of the prism and consequently the corresponding portions of the mask 34, at which the light openings 35 and 36 are respectively disposed, are disposed in the same radial plane of the reticle axis, which results in the reticle design of the mask being flat.

However, in Figure 5 the portions 39 and 40 of the exit face 24 of the prism and consequently the corresponding portions of the mask 34, at which the light openings 35 and 36 are respectively disposed, are spaced from each other longitudinally of the reticle axis and the portion 39 of the exit face and mask at the center light opening 35 is closest to the entry face 23 and the light source 31, which results in the reticle design of the mask being concave in the direction toward the projection objective with which the reticle is used for the purpose hereinabove explained.

Referring to Figures 6 and 7, a light transmitting prism of circular disk form and of suitable material, such as optical glass, is designated at 42 and is disposed across the reticle axis 43 in concentric relation therewith and the opposite faces 44 and 45 of the prism provide light entry and exit faces. The prism is also provided with three additional faces 46, 47 and 48 providing internally reflecting faces of frusto-conical form and of different diameters disposed concentrically of and at correspondingly extending acute angles to the reticle axis, and the diametrically smallest reflecting face 46 is provided by an annular depression 49 at the exit face 45 and disposed concentrically of the reticle axis and providing a hub 50 forming the central portion of the exit face, and the diametrically intermediate and largest reflecting faces 47 and 48 are formed about the entry face 44. The reflecting faces 46, 47 and 48 are preferably silver coated in the usual manner to increase the reflection therefrom.

The smallest or reticle axis adjacent reflecting face 46 is directed internally of the prism 42 toward the entry face 44 and the diametrically intermediate and largest or reticle axis intermediately and farthest remote reflecting faces 47 and 48 to reflect light, as designated respectively at 51 and 52, to the intermediate and largest reflecting faces from, as designated respectively at 53 and 54, a light source 55, shown as the filament of an incandescent lamp 56 in Figure 7, on and spaced along the reticle axis 23 from the prism 42 and the reticle design forming mask hereinafter referred to, and the intermediate and largest reflecting faces are directed internally of the prism toward the exit face 45 and the smallest reflecting face and reflect light, as designated respectively at 57 and 58, so reflected thereto toward the exit face.

An opaque reticle design forming mask 59 is provided at the exit face 45 and preferably, as shown, covers the surfaces of the depression 49 and the peripheral portion of the prism including the intermediate and largest reflecting faces 47 and 48, thus protectively covering the silver coating of the reflecting faces 46, 47 and 48, the mask preferably being a relatively thick paint coating.

The mask 59 is provided with a first light opening 60 therethrough at the reticle axis and the hub 50 through which light passes along the reticle axis from the light source to illuminate the same, and is provided with two annular additional light openings 61 and 62 therethrough of different diameters and disposed concentrically of the reticle axis and consequently adjacently and remotely spaced radially therefrom and disposed in surrounding relation with the depression 49, and through which light openings 61 and 62 light is reflected respectively by the intermediate and largest reflecting faces 47 and 48 in relatively non-dispersive relation with the reticle axis to illuminate these light openings so that the projected images of these light openings are of adequate brilliancy as hereinbefore explained.

In Figure 6 the portions 63 and 64 of the exit face 45 of the prism and consequently the corresponding portions of the mask 59, at which the light openings 60 and 61 are respectively disposed, are disposed in the same radial plane of the reticle axis which results in the reticle design of the mask being flat.

However, in Figure 7 the portions 65, 66 and 67 of the exit face 45 of the prism and consequently the corresponding portions of the mask 59, at which the light openings 60, 61 and 62 are respectively disposed, are spaced from each other longitudinally of the reticle axis and the portion 65 of the exit face and mask at the center light opening 60 is closest to and the portion 67 of the exit face and mask at the diametrically larger annular light opening 62 is farthest from the entry face 44 and light source 55, which results in the reticle design of the mask being concave in the direction toward the projection objective with which the reticle is used for the purpose hereinabove explained.

While I have thus described my invention, I do not wish to be limited to the precise details described, as changes may be readily made without departing from the spirit of my invention, but having thus described my invention, I claim as new and desire to secure by Letters Patent the following:

1. In an optical reticle, the combination of a reticle design forming mask provided with an annular light opening therethrough, and two generally frusto-conical reflectors of different diameters disposed concentrically of said light opening and at correspondingly extending acute angles to their axis and of which the diametrically smaller reflector is directed away from said mask and toward the diametrically larger reflector to reflect to the larger reflector light received from along said axis and of which the larger reflector is directed toward said smaller reflector and mask and reflects light so reflected thereto through said light opening in relatively non-dispersive relation with said axis.

2. In an optical reticle, the combination of a circular reticle design forming mask provided with an annular light opening therethrough adjacently spaced radially inward from the periphery of said mask, of an annular member axially engaged against said mask in concentric relation therewith at the peripheries of said mask and annular member and forming with said mask an annular partial enclosure open internally thereof and embracing said light opening, and two generally frusto-conical reflectors of different diameters disposed concentrically of said light opening and at correspondingly extending acute angles to their axis and of which the diametrically smaller reflector is provided on the face of said mask opposedly related with said annular member and is directed away from said mask and toward the diametrically larger reflector to reflect to the larger reflector light receiver from along said axis and of which the larger reflector is provided on the face of said annular member opposedly related with said mask and is directed toward said smaller reflector and mask and reflects light so reflected thereto through said light opening in relatively nondispersive relation with said axis.

3. In an optical reticle, the combination of a reticle design forming mask provided with a first center light opening therethrough and with an annular second light opening therethrough disposed concentrically of said first light opening, and two generally frusto-conical reflectors of different diameters disposed concentrically of said light openings and at correspondingly extending acute angles to their axis and of which the diametrically smaller reflector is directed away from said mask and toward the diametrically larger reflector to reflect to the larger reflector light received from along said axis and of which the larger reflector is directed toward said smaller reflector and mask and reflects light so reflected thereto through said second light opening in relatively non-dispersive relation with said axis, and the portion of said mask at said first light opening being spaced longitudinally of said axis from the portion of said mask at said second light opening in the direction opposite that of said received light.

4. In an optical reticle, the combination of a reticle design forming mask provided with two annular concentric light openings therethrough of different diameters, and three generally frusto-conical reflectors of different diameters disposed concentrically of said light openings and at correspondingly extending acute angles to their axis and of which the diametrically smallest reflector is directed away from said mask and toward the diametrically intermediate and largest reflectors to reflect to said intermediate and largest reflectors light received from along said axis and of which said intermediate and largest reflectors are directed toward said smallest reflector and mask and reflect light so reflected thereto respectively through said diametrically smaller and larger light openings in relatively non-dispersive relation with said axis.

5. In an optical reticle, the combination of a reticle design forming mask provided with a first center light opening therethrough and with two annular additional light openings therethrough of different diameters and disposed concentrically of said first light opening, and three generally frusto-conical reflectors of different diameters disposed concentrically of said light openings and at correspondingly extending acute angles to their axis and of which the diametrically smallest reflector is directed away from said mask and toward the diametrically intermediate and largest reflectors to reflect to said intermediate and largest reflectors light received from along said axis and of which said intermediate and largest reflectors are directed toward said smallest reflector and mask and reflect light so reflected thereto respectively through said diametrically smaller and larger annular light openings in relatively non-dispersive relation with said axis, and the portion of said mask at said diametrically smaller annular light opening being spaced longitudinally of said axis from the portion of said mask at said diametrically larger annular light opening and the portion of said mask at said first light opening being spaced longitudinally of said axis from the portion of said mask at said diametrically smaller annular light opening both in the direction opposite that of said received light.

6. In an optical reticle, the combination of a light transmitting prism of disk form the opposite faces of which provide light entry and exit faces and said prism having two additional faces providing internally reflecting faces of generally frusto-conical form and of different diameters disposed concentrically and at correspondingly extending acute angles to their axis and of which the diametrically smaller reflecting face is directed internally of said prism toward said entry face and the diametrically larger reflecting face to reflect to said larger reflecting face light received from along said axis and of which the diametrically larger reflecting face is directed internally of said prism toward said exit face and smaller reflecting face and reflects light so reflected thereto toward said exit face in relatively non-dispersive relation with said axis, said smaller reflecting face being provided by a circular depression at said exit face and disposed concentrically of said axis and said larger reflecting face being formed about the periphery of said entry face, and a reticle design forming mask at said exit face and provided with an annular light opening therethrough disposed concentrically of said axis in surrounding relation with said depression and through which light is reflected by said larger reflecting face.

7. In an optical reticle, the combination of a light transmitting prism of disk form the opposite faces of which provide light entry and exit faces and said prism having two additional faces providing internally reflecting faces of generally frusto-conical form and of different diameters disposed concentrically and at correspondingly extending acute angles to their axis and of which the diametrically smaller reflecting face is directed internally of said prism toward said entry face and the diametrically larger reflecting face to reflect to said larger reflecting face light received from along said axis and of which the larger reflecting face is directed internally of said prism toward said exit face and smaller reflecting face and reflects light so reflected thereto toward said exit face in relatively non-dispersive relation with said axis, said smaller reflecting face being provided by an annular depression at said exit face and disposed concentrically of said axis and providing a hub forming the central portion of said exit face and said larger reflecting face being formed about the periphery of said entry face, and a reticle design forming mask at said exit face and provided with a first light opening therethrough at said axis and hub and with an annular second light opening therethrough disposed concentrically of said axis in surrounding relation with said depression and through which second light opening light is reflected by said larger reflecting face.

8. In an optical reticle, the combination of a light transmitting prism of disk form the opposite faces of which provide light entry and exit faces and said prism having three additional faces providing internally reflecting faces of generally frusto-conical form and of different diameters disposed concentrically and at correspondingly extending acute angles to their axis and of which the diametrically smallest reflecting face is directed internally of said prism toward said entry face and the diametrically intermediate and largest reflecting faces to reflect to said intermediate and largest reflecting faces light received from along said axis and of which said intermediate and largest reflecting faces are directed internally of said prism toward said exit face and smallest reflecting face and reflect light so reflected thereto toward said exit face in relatively non-dispersive relation with said axis, said smallest reflecting face being provided by an annular depression at said exit face and disposed concentrically of said axis and providing a hub forming the central portion of said exit face and said intermediate and largest reflecting faces being formed about the periphery of said entry face, and a reticle design forming mask at said exit face and provided with a first light opening therethrough at said axis and hub and with two annular additional light openings therethrough of different diameters and disposed concentrically of said axis in surrounding relation with said depression and through which additional annular light openings light is reflected respectively by said intermediate and largest reflecting faces.

9. In an optical reticle, the combination as set forth in claim 7, and further characterized in that the portion of said mask and exit face at said first light opening is spaced longitudinally of said axis from the portion of said mask and exit face at said second light opening in the direction opposite that of said received light.

10. In an optical reticle, the combination as set forth in claim 8, and further characterized in that the portion of said mask and exit face at said diametrically smaller annular light opening is spaced longitudinally of said axis from the portion of said mask and exit face at said diametrically larger annular light opening and the portion of said mask and exit face at said first light opening is spaced longitudinally of said axis from the portion of said mask and exit face at said diametrically smaller annular light opening both in the direction opposite that of said received light.

BRUNO STECHBART.